Dec. 30, 1969     C. MATTHEWS     3,486,581

AUTOMATIC SPRAY OILER

Filed Jan. 9, 1968     2 Sheets-Sheet 1

INVENTOR
CLAY MATTHEWS
BY
William R. Piper
ATTORNEY

Dec. 30, 1969 C. MATTHEWS 3,486,581
AUTOMATIC SPRAY OILER
Filed Jan. 9, 1968 2 Sheets-Sheet 2
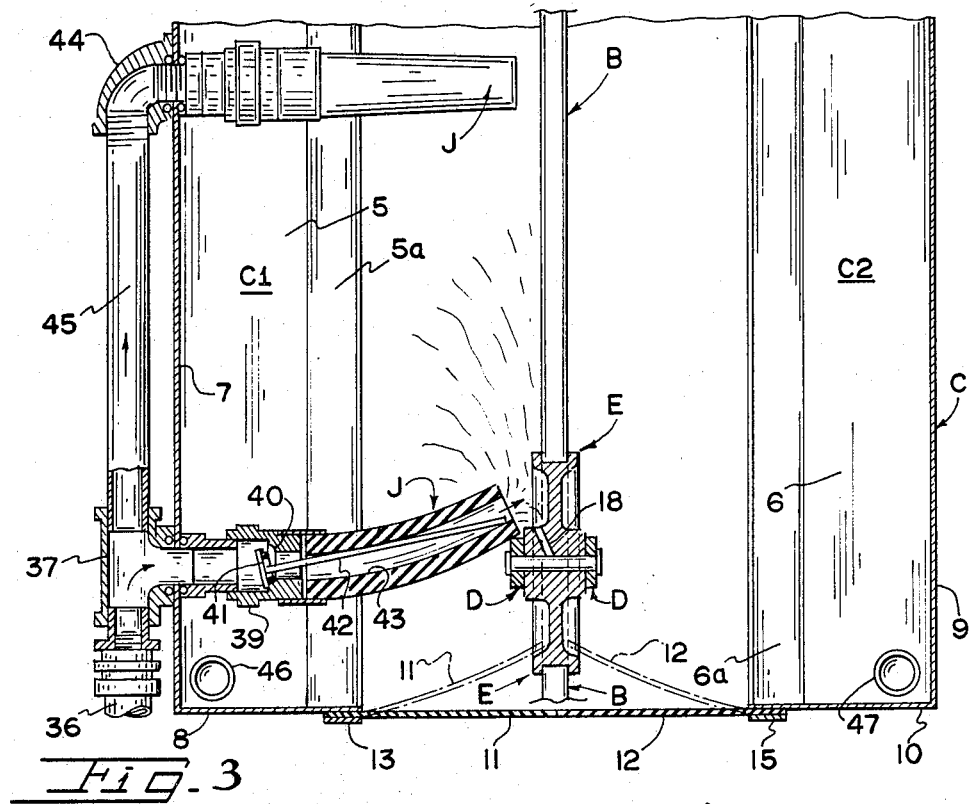
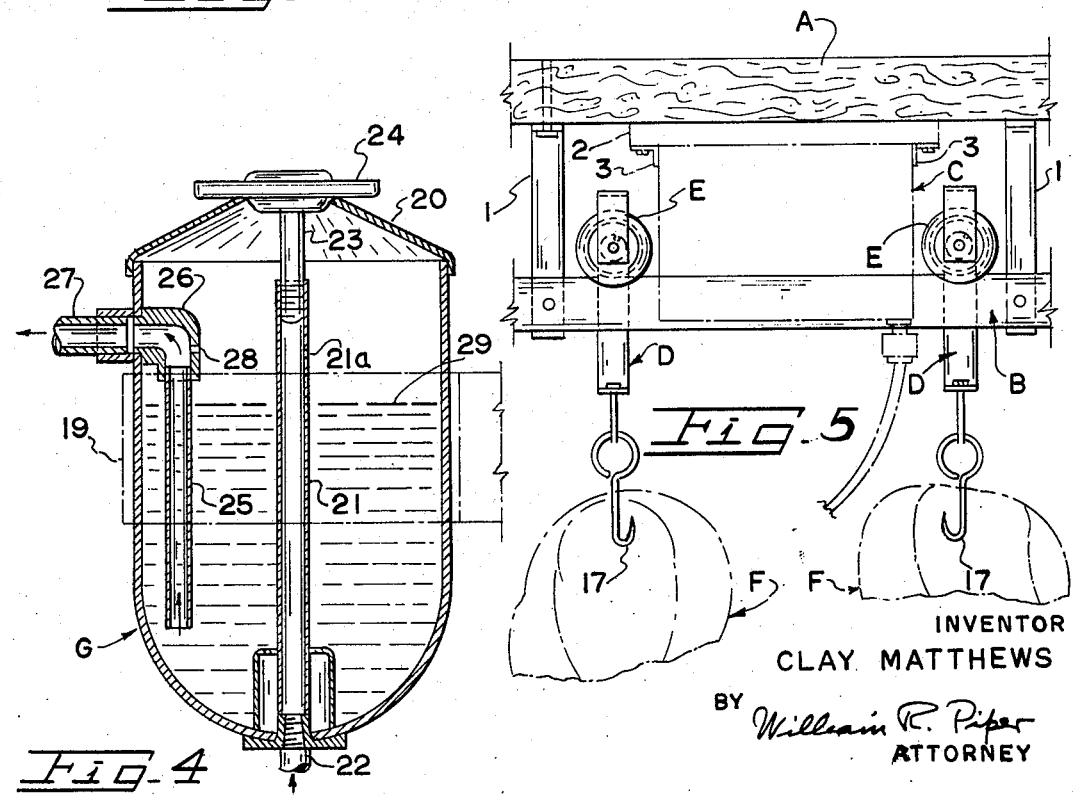
INVENTOR
CLAY MATTHEWS
BY William R. Piper
ATTORNEY _United States Patent Office_

3,486,581
Patented Dec. 30, 1969

3,486,581
AUTOMATIC SPRAY OILER
Clay Matthews, 25874 Bell Aire Drive,
Hayward, Calif. 94544
Filed Jan. 9, 1968, Ser. No. 696,650
Int. Cl. B61k *3/00;* B65b *1/04;* B67c *3/00*
U.S. Cl. 184—3          3 Claims

ABSTRACT OF THE DISCLOSURE

The automatic spray oiler has an inverted U-shaped housing that straddles a track on which meat-carrying trolleys travel. The track extends through the housing and flexible nozzles are contacted by the trolleys or hangers as they move along the track through the housing for automatically opening nozzle valves and causing the nozzles to spray an atomized mineral oil onto the wheels that support the hangers for lubricating the wheels. Novel means is used for supplying the nozzles with the atomized mineral oil under pressure.

BACKGROUND OF THE INVENTION

Field of the invention

In the curing of meat such as bacon and ham it is necessary to expose bacon to a temperature of about 140° F. for a period of eight and one-half hours and expose ham to the same temperature for about fifteen hours. The meat is supported by hooks that in turn are carried by hangers. Wheels support the hangers and they ride on tracks that extend into the meat curing room where the temperature is maintained at 140° F. The wheels must be lubricated and only mineral oil can be used because this is edible should any of the oil contact the meat.

The protracted meat curing time of from eight and one-half to fifteen hours at a temperature of 140° F. has a drying effect on the mineral oil in the wheel bearings. Morever, cold water showers are sprayed onto the meat when it is removed from the curing room in order to reduce the temperature of the meat quickly and save the loss of evaporation of water from the meat which also saves in the meat being reduced in weight. The cold water tends to remove the mineral oil from the wheel bearings with the result that the wheels have a tendency to "freeze" through lack of lubrication and will not rotate. When now the operator tries to force the hangers along the track while supporting meat up to 1,000 pounds in weight, the "frozen" non-rotating wheel may be forced off the track and the entire load of meat and hanger come tumbling down with sometimes disastrous effects to the operator should the hanger or hook strike him.

Description of the prior art

The patent to Schaefer No. 1,919,451, discloses a housing to prevent oil and grease from his device falling onto portions of the conveyor not intended to be lubricated. The patent does not show flexible nozzles that are flexed by the meat-carrying hangers contacting them as they pass to automatically open valves in the nozzles for spraying an atomized mineral oil on the bearings of the wheels that support the hangers.

The patent to Leach No. 2,022,726, shows a device for aiming an oil injection directly at the bearing to be lubricated. The nozzles are designed to direct a stream of oil rather than an atomized spray onto the bearing.

SUMMARY OF THE INVENTION

An object of my invention is to provide an automatic spray oiler that has a housing which may be supported by the same girder that supports the track. The track extends entirely through the inverted U-shaped housing and flexible flaps are provided at each housing end so that the atomized spray of mineral oil when delivered to the hanger wheel bearing will be contained within the housing. The bearing has an opening for receiving the lubricant and when the wheel hanger flexes the nozzle for automatically opening the nozzle valve, the spray of atomized mineral oil under a predetermined pressure will be guided directly into the lubricant-receiving bearing opening.

The automatic spray oiler is preferably mounted to enclose the portion of the meat-carrying track that is disposed adjacent to the meat-curing room. In this way the hanger wheel bearings will be lubricated just before the meat is moved into the curing room and will be lubricated again as soon as the cured meat is removed from the room. This will prevent the wheel bearings from "freezing" through lack of sufficient lubrication. Two flexible nozzles are mounted in the housing for spraying atomized mineral oil on the trolley wheel bearing twice as the trolley passes through the housing in either direction.

BRIEF DESCRIPTION OF THE DRAWINGS

FIGURE 3 is a horizontal section taken along the line 3—3 of FIGURE 2, portions being shown in elevation.

FIGURE 4 is an enlarged vertical section through one of the oil reservoirs and is taken along the line 4—4 of FIGURE 1.

FIGURE 5 is a side elevation of a portion of the trolley track and shows my device by dot-dash lines in the proper position with relation to the track and the trolleys.

DESCRIPTION OF THE PREFERRED EMBODIMENT

In carrying out my invention I show in FIGURE 5 a horizontal girder or beam indicated generally at A. This beam supports straps 1, that extend downwardly and support a rail or track B. My automatic spray oil is shown schematically by dot-dash lines C, and it may be secured to the beam A in any manner desired. I show a spacing member 2 attached to the beam A, and brackets 3 secure the automatic spray oiler C to the spacer in such a position that the track B will extend through the spray oiler from one end to the other as will now be explained.

Figure 1:
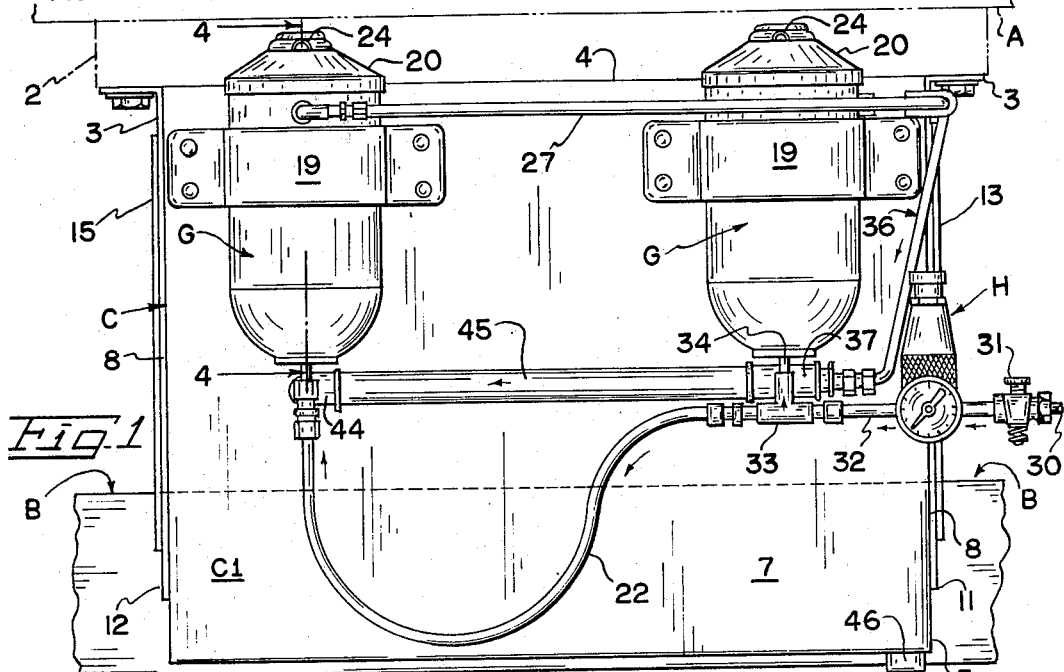
FIGURE 1 is a side elevation of the automatic spray oiler.
Figure 2:
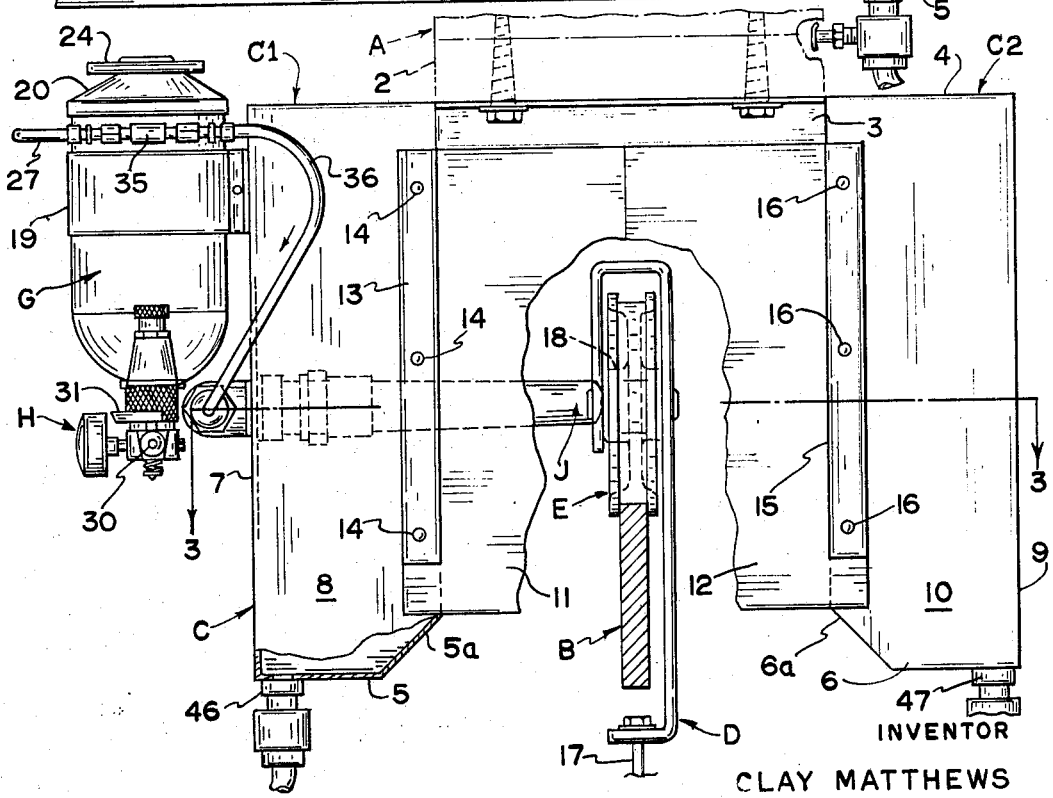
FIGURE 2 is an end elevation of the device when looking at the right hand end of FIGURE 1.

In FIGURES 1 and 2, I illustrate the automatic spray oiler C and it comprises a stainless steel inverted U-shaped housing whose top wall 4 contacts the underside of the spacer 2. The housing has two compartments C1 and C2 that extend downwardly from the top wall 4 and straddle the rail or track B. The compartment C1 has a trough-shaped bottom 5 for receiving any excess mineral oil and the compartment C2 has a trough-shaped bottom 6 for receiving any condensate from the atomized mineral oil which will be explained hereinafter. FIGURE 2 shows the inner side 5a of the trough 5, inclined upwardly and inwardly at an angle and shows the inner side 6a of the trough 6, inclined upwardly and inwardly at an angle.

The compartment C1 is formed by the top wall 4, an outer side wall 7, see FIGURE 3, end walls 8 and the trough-shaped bottom 5. The inner portion of the compartment C1 opens into the interior of the housing C except for the upwardly and inwardly inclined side 5a of the trough 5. In like manner the compartment C2 is formed by the top wall 4, an outer side wall 9, end walls 10 and the trough-shaped bottom 6. The inner portion of the compartment C2 opens into the interior of the housing C except for the upwardly and inwardly inclined side 6a of the trough 6. The open ends of the housing that are formed by the spaced apart compartments C1 and C2 receive a portion of the track or rail B, see FIGURE 2, and these ends are closed by flexible flaps. Since the flaps at each end of the housing are identical to each other, the flaps shown at 11 and 12 in FIGURE 2, will be described in detail and this will suffice for the flaps at the other end of the housing and indicated in FIGURE 1. The flap 11 is secured to the end wall 8 by a strip 13 and fastening means 14 while the flap 12 is secured to the end wall 10 by a strip 15 and fastening means 16. Both FIGURES 2 and 3 show the normal position of the flaps in closed position with their inner edges abutting each other and the latter figure shows the two flaps flexed inwardly by dot dash lines to permit the entrance of a meat-carrying trolley which will now be described more in detail.

Again referring to FIGURE 5, I show a pair of trolleys indicated generally at D, provided with supporting wheels E that ride on the track or rail B. The two trolleys may be interconnected and each has a depending hook 17 on which the meat F to be cured hangs. Each wheel E has an opening 18 in its hub for receiving lubrication, see FIGURES 2 and 3. I will now describe the mechanism for spraying an atomized mineral oil twice into the opening 18 as the wheel E travels through the housing C.

I provide two mineral oil retaining reservoirs G, see FIGURE 1, and secure these to the side 7 of the housing C, by brackets 19. Both reservoirs are identical in construction so a detailed description of one will suffice for both and like parts in the two reservoirs will receive similar numerals. The reservoir G is shown in section in FIGURE 4, and it has a casing closed at its top by a removable cover 20. A central tube 21 communicates with an air inlet pipe 22 and the tube is threaded interiorly at its upper end for receiving a threaded shank 23 of a handle 24. The handle extends through an opening in the top of the cover 20 and the operator can secure the cover in closed position by screwing the shank 23 down into the top of the tube 21. The tube 21 has a small air outlet 21a for permitting air under pressure from the pipe 22 to enter the interior of the reservoir G that contains the mineral oil.

An oil outlet pipe 25 is disposed in the reservoir casing G and has its upper end secured to an elbow 26 which in turn is supported by the casing wall and communicates with an outlet pipe 27. The elbow 26 has a small bleed hole 28 therein and the level of the mineral oil 29 in the reservoir G must be below this opening. The oil outlet pipe 25 extends to a point near the bottom of the reservoir. When air under pressure of about thirty pounds per square inch enters the tube 21 from the pipe 22, it will flow into the top of the reservoir G through the outlet opening 21A. From here the air will enter the elbow 26 through the opening 28 and the small stream of air upon entering the elbow will have an entraining action on the oil in the outlet pipe 25 and will lift this oil and atomize it and send the atomized oil into the outlet pipe 27.

Before describing how the atomized oil is conveyed to the opening 18 in the wheel hub for lubricating the wheel bearing, it is best to first set forth how the pipe 22 receives air under pressure. Referring to FIGURES 1 and 2, it will be seen that an air pressure line 30 is connected to a shut off valve 31 and an air pressure regulator indicated generally at H. A pipe 32 leads from the regulator H to a T indicated at 33. The air pipe 22 leads from the T shown at 33 to the reservoir G that is shown in section in FIGURE 4. Another air pipe 34 leads from a branch in the T to the right hand oil reservoir G shown in FIGURE 1.

The pipe 27 from the left hand oil reservoir G shown in FIGURE 1 carries atomized mineral oil as a vapor and FIGURE 2 shows this pipe communicating with a T indicated at 35 whose branch is connected to the outlet pipe, not shown, that communicates with the right hand oil reservoir G, in FIGURE 1. Therefore the T illustrated at 35 in FIGURE 2 receives atomized mineral oil under a pressure of about thirty pounds from both reservoirs G. A pipe 36 leads from the T 35 to a T 37 that is carried by the side wall 7 of the housing C. A flexible nozzle J communicates with a branch of the T 37 for receiving the atomized mineral oil from a T 37. FIGURE 3 shows the outer end of the nozzle J, clearing the rim of the wheel E, but lying in the path of the trolley bracket D so as to be flexed by the bracket as the wheel passes.

The flexible nozzle J, shown in section in FIGURE 3 has a base 39 with a valve seat 40, and a disc valve 41 is normally held against the seat 40 by the pressure of the atomized mineral oil to keep the valve closed. The disc valve has a central stem 42 that extends into the bore 43 of the flexible portion of the nozzle J. When the free end of the nozzle is flexed by coming into contact with the bracket of the trolley D, as shown by the section view of the nozzle, the outer end of the stem will be moved laterally by the curved nozzle and this will rock the disc valve 41 into an inclined position with respect to the valve seat 40 and will open the valve. The atomized mineral oil will now past the opened valve and be directed by the nozzle to deliver a stream of the vapor or spray directly upon the hub of the wheel and into the opening or bore 18 in the hub for lubricating the wheel bearing. As soon as the trolley D passes the end of the nozzle to free it, the nozzle will straighten out and the vapor pressure on the valve disc 41 will close it against the seat 40 and thus close the valve.

The other flexible nozzle J is in communication with the T 37 by means of an elbow 44 and a pipe 45 that connects the elbow to the T, as clearly shown in FIGURE 3. This other or second flexible nozzle J operates in identically the same way as the one already described. The second nozzle will deliver another application of atomized mineral oil to the wheel bearing as the wheel E passes this nozzle. Therefore the wheel bearing will receive two shots of atomized oil each time it passes through the housing. On the return trip of the trolleys through the housing, the two nozzles J will be progressively flexed to again deliver two shots of atomized mineral oil onto the wheel bearings.

The housing C retains all of the vaporized mineral oil not received by the wheel bearings. This vaporized or atomized oil is prevented from leaving the housing by the normally closed flaps 11 and 12. These flaps will only open to permit a trolley D to pass into or out of the housing. The condensed mineral oil will be caught in the troughs 5 and 6. FIGURE 2 shows the troughs 5 and 6 provided with drain plugs 46 and 47, respectively. Conduits may lead from the plugs to carry away the condensate when it is desired to drain the troughs of liquid.

I have provided automatic means for lubricating the bearings of wheels that support meat-carrying trolleys. The wheels E cannot "freeze" and they will always be provided with sufficient lubrication. The housing C is large enough to accommodate trolley wheels that are four and five inches in diameter. Various lengths of track hangers can also pass through the housing. Only thirty pounds of air pressure is required to operate the device. No electric current is used and there can be no electric shocks experienced by the operators.

The device can be located at any desired place along the track or rail. It is preferably placed on the track immediately after the smoke house or showers. In refilling the oil reservoirs, the air is shut off and the covers 20 are removed. The reservoirs are filled with oil to approximately one and one-half inches from the top.

I claim:

1. An automatic spray oiler comprising:

(a) a housing positioned adjacent to a track on which a wheel rolls that supports a trolley;

(b) a flexible nozzle supported by said housing so that the outlet end of the nozzle will be flexed by the trolley as the latter moves thereby so that the nozzle end will point at the trolley wheel;
(c) means for delivering an atomized lubricant under pressure to said nozzle; and
(d) a valve mounted in said nozzle and normally kept closed by the pressure of the atomized lubricant pressing against the valve, said valve having a stem extending along the length of the bore in the nozzle, the stem being moved laterally when the nozzle is flexed and opening the valve to permit the atomized lubricant to be directed at the wheel for lubricating it;
(e) the means for delivering the atomized lubricant including at least one lubricant retaining reservoir;
(f) a pipe for delivering air under pressure into the top of the reservoir;
(g) an outlet pipe entering the reservoir above the level of the lubricant therein and having its entrance end disposed near the bottom of the reservoir for withdrawing lubricant therefrom;
(h) said outlet pipe having a small opening therein communicating with the air space within said reservoir and above the liquid level and said outlet pipe communicating with said valve controlled nozzle;
(i) whereby a flexing of said nozzle by the trolley will open said valve and permit air under pressure to flow from said air delivery pipe into the top of said reservoir and through the small opening in said outlet pipe for entraining lubricant from the entrance end of the outlet pipe, the air mixing with the lubricant for atomizing it and carrying the atomized lubricant through the nozzle and into the lubricant receiving opening of the trolley wheel.

2. An automatic spray oiler comprising:
(a) a housing positioned adjacent to a track on which a wheel rolls that supports a trolley;
(b) a flexible nozzle supported by said housing so that its axis extends normally at right angles to the line of travel of the wheel on the track, the outlet end of said nozzle being engaged by the wheel trolley as it moves thereby so that the nozzle will be flexed into an arc with the nozzle end pointing at the wheel;
(c) means for delivering an atomized lubricant under pressure to said nozzle; and
(d) a valve mounted in said flexible nozzle and including a seat and a disc-shaped body normally kept pressed against the seat for closing the valve by the pressure of the atomized lubricant pressing against the disc-shaped body, said valve disc having a central stem extending at right angles to the plane of the disc, said stem projecting along the length of the nozzle bore and being moved laterally for unseating the disc from the valve seat when the nozzle is flexed into a slight arc by the passing wheel and trolley and engages the stem to swing it;
(e) whereby the valve will be opened and will permit the pressurized and atomized lubricant to flow past the valve and along the interior of the nozzle and be directed against the wheel for lubricating it.

3. The combination as set forth in claim 2: and in which
(a) the trolley wheel has a hub with a lubricant receiving opening therein and having a rim that will not contact the nozzle as the wheel moves thereby;
(b) the trolley has a portion near the wheel hub that will strike said nozzle to flex it as the trolley and wheel pass said nozzle;
(c) whereby said valve will be opened and atomized lubricant under pressure will be directed by the nozzle and against the wheel hub and into the lubricant receiving opening.

References Cited

UNITED STATES PATENTS

| | | | |
|---|---|---|---|
| 1,149,020 | 8/1915 | Bouk et al. | 184—3 |
| 1,605,812 | 11/1926 | Davidson et al. | 184—2 |
| 1,781,554 | 11/1930 | Norton | 141—352 XR |

FOREIGN PATENTS

| | | |
|---|---|---|
| 243,087 | 1/1963 | Australia. |
| 558,723 | 5/1923 | France. |

FRED C. MATTERN, JR., Primary Examiner

MANUEL A. ANTONAKAS, Assistant Examiner

U.S. Cl. X.R.

141—352